United States Patent [19]

Street

[11] 3,941,535

[45] Mar. 2, 1976

[54] EXTRUSION DEVICE
[76] Inventor: Louis F. Street, 127 Belvidere Ave., Washington, N.J. 07882
[22] Filed: Oct. 1, 1974
[21] Appl. No.: 511,072

[52] U.S. Cl. .............................................. 425/208
[51] Int. Cl.² ......................................... B01F 7/02
[58] Field of Search .................... 425/208, 209, 206; 259/191, 192, 193, DIG. 13

[56] References Cited
UNITED STATES PATENTS

| | | | |
|---|---|---|---|
| 2,680,879 | 6/1954 | Schnuck et al. | 259/191 |
| 3,143,768 | 8/1964 | Scherping | 259/DIG. 13 |
| 3,524,222 | 8/1970 | Gregory et al. | 425/208 |
| 3,652,064 | 3/1972 | Lehnen et al. | 425/208 |
| 3,661,363 | 5/1972 | Aletti | 425/208 |

FOREIGN PATENTS OR APPLICATIONS

| 350,112 | 10/1905 | France | 425/209 |
|---|---|---|---|

Primary Examiner—Al Lawrence Smith
Assistant Examiner—Robert C. Watson
Attorney, Agent, or Firm—George E. Kersey

[57] ABSTRACT

The present invention relates to an improvement in screw extrusion apparatus for handling resinous thermoplastic and similar materials, which has a portion of the length of the screw supplied with protuberances rising from the root of the screw and terminating in an outer surface spaced from the extruder bore giving intensive high shear treatment to the process material in the space therebetween with a dynamic volumetric treating capacity in this space greater than one and one half times the total throughput rate and between these protuberances passageways for separating and recombining of material to effect low shear high volume mixing.

8 Claims, 6 Drawing Figures

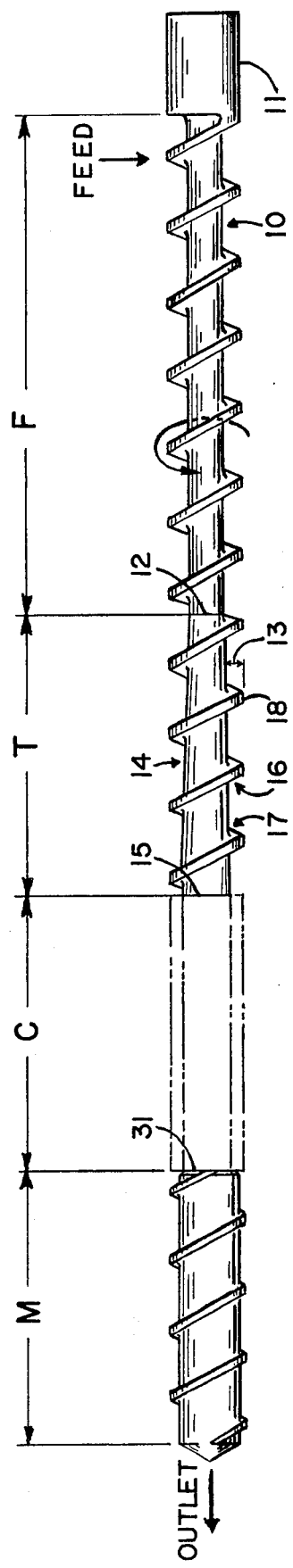
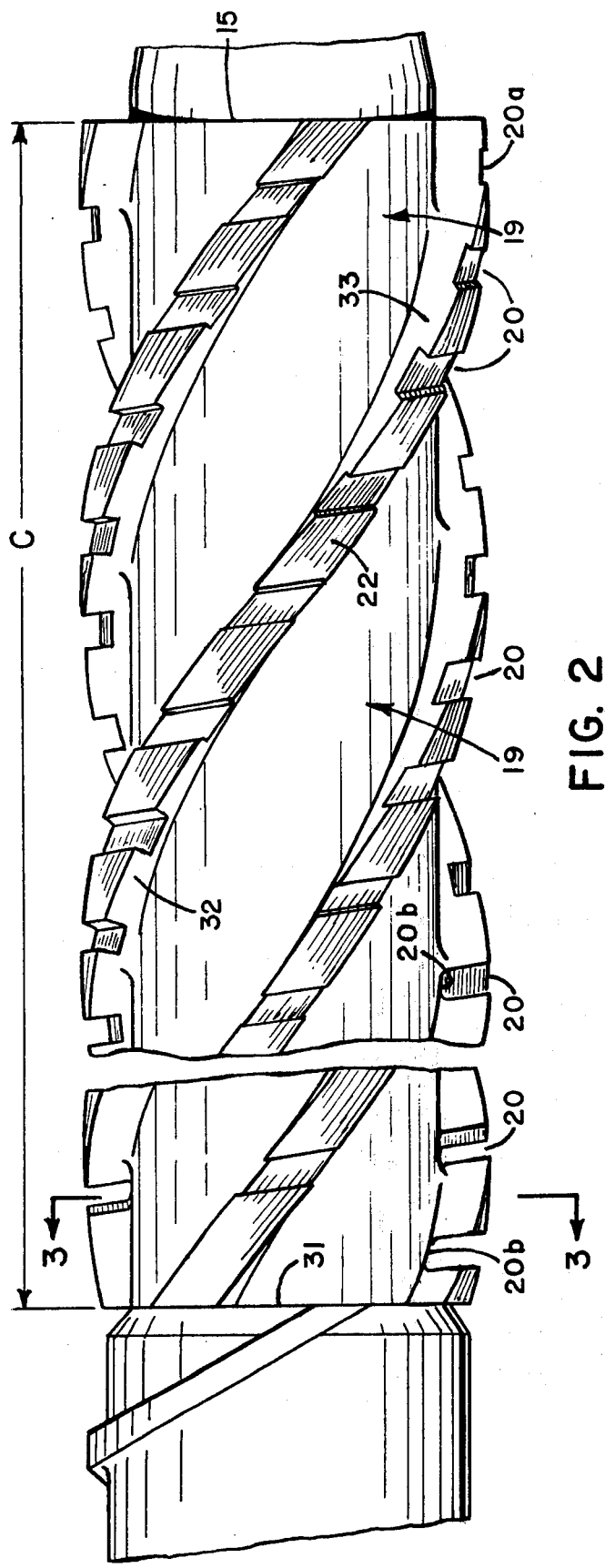
FIG. 1
FIG. 2

EXTRUSION DEVICE

In past practice in the melting of a pellet or powder feed of a thermoplastic material one of the limitations of the process in a single screw extruder is the heat transfer rate across the interface which carries heat from the molten liquid to the unmelted particles. This heat transfer rate plays a dominating role in the process and limits the throughput rate obtainable of acceptable quality molten product. The material in molten phase on the one hand and that material in the solid particle phase on the other hand each maintain themselves in large streams or assemblages distinct from each other being adjacently positioned and having a common boundary or interface. The relative location of the particulate material and the molten or liquid material in an extruder screw has been widely disclosed in the literature including: "Polymer Engineering and Science", February 1974, Vol. 14, No. 2, pages 101 to 111; "SPE Journal", October 1972, Vol. 28, pages 56 to 63; Ibid. July 1972, Vol. 28, pages 36 to 40; "International Plastics Engineering", July 1961, Vol. 1, No. 6, pages 289 to 296.

The past limitation of the heat transfer rate across the interface is overcome by the present invention. A conventional screw consisting of a normally deep feed section for accepting pellet or powder feed followed by a tapered transition section advances the process stream at the desired rate of material and achieves a desired ratio of molten material at the downstream end of the transition section. The ratio of molten material to the total rate may preferably be between 50 percent and 80 percent. The process stream then flows into the mixing section device which characterizes the present invention. While flowing through this device the material is subjected both to intensive dispersive mixing and non-intensive high volume distributive mixing. In this description the term dispersive mixing will refer to intensive treatment for the mixing together of non-uniform constituents such as powders into liquids in which case agglomerates of powder must be disintegrated so that each particle can be surrounded by liquid, and pellets of thermoplastic which have not yet melted and are desired to be melted and mixed into the molten phase. The term distributive mixing will refer to low intensity mixing of a stirring character. The device is provided with protuberances rising substantially radially from the screw root each protuberance terminating in an outer surface radially spaced from the inner surface of the surrounding bore to provide a spacing therebetween. The magnitude of the radial distance of this spacing will depend on the overall length of the device, the intensity of the treatment desired, and the throughput rate of the total system and will usually be greater than 0.001 times said inside diameter of the bore while being less than 0.02 times said inside diameter. Throughout a predetermined axial length the portion of the total area of the inside surface of said bore which is in radially spaced relationship with said outer surfaces will comprise less than 50 percent of said total area. Between the protuberances are passageways for movement of the process stream permitting it to flow in a downstream direction while simultaneously flowing through substantially circumferential passageways. The axial length of the protuberances between circumferential passageways is less than the inside diameter of the bore.

In the radial spacing between the outer surfaces of the protuberances and the inner surface of the bore material is subjected to high shear and small unmelted particles are subjected to a rapid rate of melting while cooler portions of melt absorb more energy because of their higher viscosity than do hotter portions of lower viscosity. In the adjacent deep channels between the protuberances the process stream is repeatedly divided and recombined thus greatly increasing the surface contact area between particles and melt thus increasing the quantity of total heat transfer. There is a continuing interchange of material between the deep channels and the high shear gaps thus giving a thorough dispersive and distributive treatment to the material. A sufficient length of the screw is devoted to this geometry and treatment method to complete or substantially complete the melting process. The continuing interchange of material between the deep channels and the high shear spacings occurs in a random mixing manner and some portions of material will be treated in the gaps more frequently than other portions. The total dynamic volumetric treatment capacity can have a value equal to several times the total throughput rate in processes where it is found desirable for satisfactory treatment. A satisfactory method of determining the total dynamic volumetric treatment capacity is through the use of a formula for calculating the volume of material entrained in these spacings. A satisfactory formula is as follows: The inside diameter of the bore times $\pi$ times the sum of the axial lengths of all protuberances as measured at their outer surfaces times the radial distance from the outer surface to the inside surface of the bore times RPM times 60 = cubic inches of volume generated in these spacings in one hour. This is converted to pounds per hour by dividing by 2 to allow for the rotational shear effect resulting from the fact that the process material touching the outer surfaces of the protuberances rotates with those surfaces while the material in the spacings between the outer surfaces and the bore is uniformly sheared resulting in only half the quantity being treated that would be indicated by the total volume, and divide by the cubic inches of volume per pound of the molten material being processed. The answer equals the pounds per hour which are treated in the high shear gaps and this represents the total dynamic volumetric treatment capacity of the device. The total dynamic volumetric capacity preferably will be greater than the total throughput rate in order to use the device to full advantage. The minimum ratio will preferably be 1½ to 1. In the passageways between the protuberances the magnitude of the radial distance from the root of the screw to the inner surface of the bore will be greater than the spacing between the outer surfaces and said bore and said distance will preferably be a value greater than .05 times said bore diameter and less than .2 times said bore diameter in order to give high volume low shear distributive mixing. In a downstream direction from this device the process material may flow to an outlet orifice if the then existing pressure level is adequate to discharge the material by viscous flow. If a higher pressure level is needed a rotating conveying and pressure generating screw section will be used prior to termination of the screw.

The melting of particles can be accelerated by sloping the outer surfaces of the protuberances relative to the inside surface of the bore such that the magnitude of the radial spacing at its leading or entering end as it rotates is greater than the magnitude of the radial spacing at its trailing end. This introduces an excess of material into the spacing thus generating an elevation in pressure and the forcing of a portion of the material out of the sides of the spacing under greater shear and mixing effect than would otherwise be obtained.

For dispersive mixing of pigments or other solid additives into a molten material, mixing of resin mixtures of differing viscosities; and other like processes the treatment is similar. A greater amount of treatment at high shear mixing including highly intensive treatment and greater duration of treatment and low shear high volume mixing is usually required in order to continue the dispersive mixing and distributive mixing for an appreciable period of time after melting has been completed. The last agglomerate of filler or pigment and the last melted pellet of plastic cannot be intermixed with the main body of the molten process stream until melting has been completed. Some pigment and filler agglomerates are readily disintegrated and mixed into the melt whereas other powder agglomerates are difficult to disintegrate and treatment must continue for a prolonged time after completion of melting. For this latter purpose the magnitude of the radial distance of the spacing will be small and correspondingly the axial length of the device will be extended in order to maintain a total dynamic volumetric treatment capacity which may equal several times the throughput rate.

The device of this invention can be housed in a cylindrical bore hollow barrel in such a manner as to receive at the feed inlet a material which has been previously treated to produce a molten stream or a partially molten stream which stream is subjected to the further treatment of this device during passage therethrough and material is discharged.

These and other features of the invention may be further understood by reference to the drawings in which:

FIG. 1 illustrates an extruder screw according to the invention rotatable within a stationary cylindrical barrel (not shown) with close running clearance with a FEED inlet at one end and an OUTLET orifice at the other end. The portion marked "C" includes the device which characterizes the invention;

FIG. 2 illustrates one embodiment of the invention wherein the protuberances are generated by supplying substantially circumferential slots through four helical flights;

Figure 3:
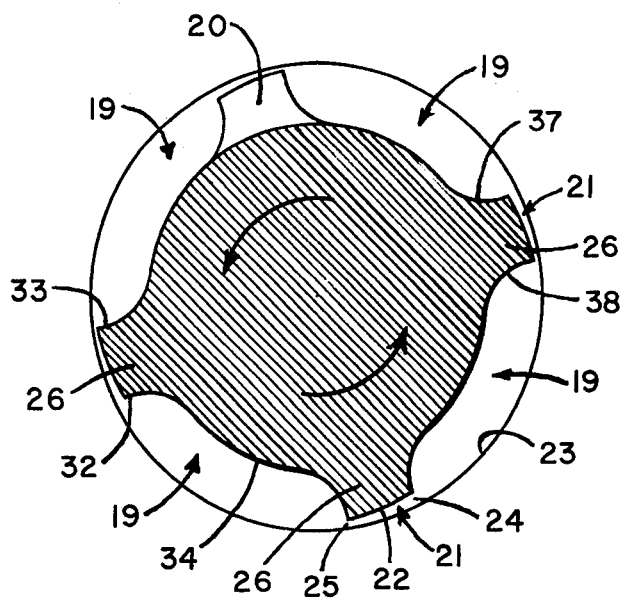
FIG. 3 illustrates a section on line 3—3 of FIG. 2.

Referring to FIG. 1 the particles of the process material entering at FEED enter the channel 10 of the screw 11 which rotates to advance the material along the screw toward the OUTLET. Frictional heat generated by the working of the material by the rotating screw and temperature control of the surrounding barrel (not shown) initiate melting of the material which melting progresses in a downstream direction simultaneously generating a continually rising pressure level in such a manner that as the material is conveyed in the direction of the OUTLET a continuing portion of the process material is converted from particles to liquid and thus a constantly greater portion of the total process material becomes liquid as the material moves along the deep initial portion of the screw F to the beginning 12 of the transition section T of the screw wherein the radial depth 13 of the channel 14 decrease in a downstream direction to a minimum depth at the downstream end 15 of the transition section T at which point the molten or liquid phase of the process material may preferably have attained a proportion of 50 percent to 80 percent of the total throughput rate. While flowing through the transition section T the solid particles are congregated in pockets or assemblages which are distinct from the molten portion with the molten portion lying generally along the rear portion 16 of the channel 14 and additionally coating the inner surface of the barrel (not shown) with a film generated in the running clearance between the outer surface 18 of the helical rib and the inside surface 23 of the bore. The solid particles are simultaneously being conveyed along the same channel 14 lying generally along the front portion 17 of the channel. As the material flows through the entrance end 15 into the device which characterizes this invention which occupies a portion C, of the screw which is illustrated in FIG. 2, the there existing high pressure level forces the process material into each of the channels 19 through which channels the material flows toward the OUTLET. Protuberances 26 rise from the screw root 34 as illustrated in FIG. 3. The protuberances are so arranged that not only channels 19 but also passageways in the form of slots 20 are provided for flow of material. In the embodiment illustrated the shape and arrangement of the protuberances 26 is such as to form an interrupted helix. This arrangement of an interrupted helix provides a conveying of the material in a downstream direction while also generating a rise in the pressure level within the material stream. As the screw rotates the drag effect of the inner surface of the stationary barrel resists rotation of the molten material which is in contact with it and thus induces a flow through the slotted passageways 20 in a direction counter to the direction of rotation of the screw. It should be clear that this counter rotation of the material is a counter rotation relative to the rotation of the screw while relative to the stationary barrel said material is rotating in the same direction as the screw but at a lesser velocity. Thus a portion of the material flows through the slotted passageways 20 while the remaining portion continues to flow along the channels 19 creating a process of separation and recombining which results in a low shear high volume mixing. Simultaneously, material is being treated in the spacing 21 between the outer surface 22 of protuberance 26 and the inner surface 23 of the bore of the stationary barrel (not shown) which intensive treatment rapidly melts the small remnants of pellets and said intensively treated material intermixes with the material in the channels 19 while concurrently a new increment of material is introduced from the channels 19 into the spacings 21 which process of intensive high shear mixing adjacent to low shear high volume mixing and interchange therebetween continues until a liquid phase of uniform homogenous quality is produced suitable for discharge at the OUTLET.

In FIG. 3 the outer surface 22 of protuberance 26 is so arranged as to have a larger radial clearance opening 24 at the leading end as the screw rotates and a smaller radial clearance opening 25 at the trailing end. The entrained pellets enter at entering opening 24 and those particles that are too large to pass through the smaller opening 25 are held between the outer surface 22 and the inner surface 23 of the bore which surfaces are moving relative to each other resulting in an intensive treatment being given to the particle surface that is moved over the surface 23 of the bore in the direction of rotation of the screw resulting in rapid heat absorption and decrease in pellet size till it is small enough to escape through the trailing opening 25. Additionally small entrained particles have their surfaces subjected to the intensive shear forces generated in the liquid phase due to the relative motion between the outer surface 22 and the inner surface 23 of the bore.

Figure 4:
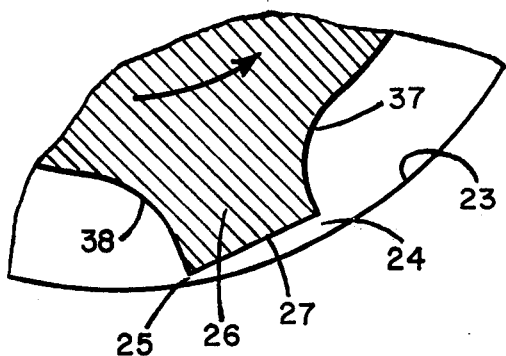
FIG. 4 is an enlarged view of a portion of FIG. 3, and illustrates another embodiment of the geometry of the outer surface of the protuberance.
Figure 5:
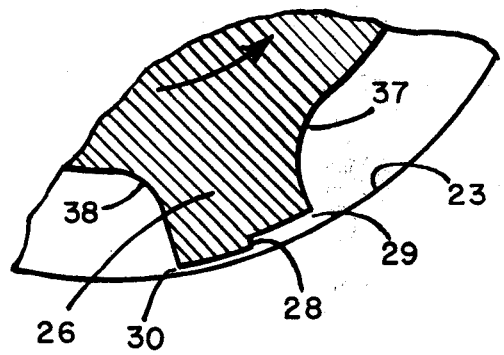
FIG. 5 is a similar enlarged view of a similar portion of FIG. 3 and illustrates a further embodiment.
Figure 6:
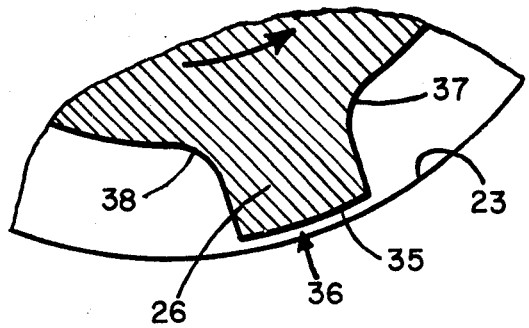
FIG. 6 is a similar enlarged view of a portion of FIG. 3 and illustrates a further embodiment.

In FIG. 4 is illustrated another embodiment wherein for convenience of manufacture a straight surface 27 is provided for the outer surface of the protuberance 26. In FIG. 5 is illustrated another embodiment wherein a step change can be beneficial in the processing of hard particulate materials such as nylon and polyethyleneterephthalate. Particles that are small enough to enter at the entering radial clearance opening 29 but are too large to pass through the trailing radial clearance opening 30 are caught at the step 28 until their size is sufficiently reduced to pass through the trailing radial clearance opening 30. In FIG. 6 is illustrated another embodiment wherein the outer surface 35 is concentric with the inner surface 23 thus leaving a spacing 36 which is uniform in radial distance in its various parts.

The bottom radii 37, 38 can be made large in order to provide an inclined plane effect to promote the introduction of the material into the spacing and to minimize stagnation in the channels at the radii.

The following example is intended to illustrate and not to restrict the invention. A six inch extruder has an inside bore diameter of the barrel of six inches and a length of 150 inches with a feed inlet at one end an outlet at the other end and fitted with a rotatably mounted screw within the barrel. The first portion or feed section F is equipped with a helical rib having a lead of six inches, a flight width of 10 percent of the lead and a depth of 0.700 inches from the outside diameter of the cylindrical form developed by the rotating helical flights with a radial running clearance between the outer surface of the ribs and inside of the bore of 0.006 inches and an axial length for this portion of the screw of 48 inches. The feed material enters through the FEED inlet and fills the screw channel to be conveyed within the channel and pressure is generated on the material while melting progresses as a result of heat generated due to frictional processes as well as heat transfer with the surface of the inside of the bore which may be temperature controlled on its outer surface by means known to those skilled in the art. As the conveying continues the material enters the transition section T of the screw which has a progressively decreasing radial depth of channel in the direction of flow with the depth decreasing from 0.700 inches to 0.500 inches from the outside diameter of the helices of this portion T of the screw while maintaining a continuation of the helical rib formation of the feed section F. The length of this portion T of the screw is 30 inches. The material leaves the transition section T flowing toward the outlet and entering a screw section C generally according to FIG. 2. In this embodiment the protuberances are so arranged as to follow a helix angle of 45° with four rows equally spaced in sequence when viewed transversely as illustrated in FIG. 3 or axially as illustrated in FIG. 2. As a result of the helical configuration of the sides 32, 33 of the protuberances a conveying and axial transporting affect is produced on the material. The protuberances have an outer surface width of 0.875 inches in a circumferential direction as viewed in FIG. 3. The slots 20 have an axial length of 0.500 inches and the protuberances have a length of one inch when measured parallel to the axis. This arrangement is shown both for suitability of performance and for ease of manufacture as the main channels 19 can be machined leaving helical ribs after which slots 20 can be cut on a machine tool set for a lead of 1.500 inches thus arriving at the geometry illustrated in FIG. 2. The radial clearance opening 25 at the trailing end of the outer surface is 0.020 inches while at the leading end the opening 24 is 0.060 inches. The depth of the four channels 19 is 0.500 inches from the outer surface at its trailing end. The radial depth of the slotted passageways 20 is 0.0625 inches from the trailing end of the outer surface where the slotted passageways first appear 20a at the upstream end 15 of the device and uniformly progressively deepen until their depth is equal to the height of the protuberances at the midpoint of the length of this portion C and continue at full depth 20b for the remaining length. The length of this portion C of the screw is 48 inches. The final portion M of the screw is equipped with a helical rib configuration of the same lead, width and rotating radial clearance as the feed section F and transition section T but with a depth of 0.290 inches from the outer surface of the ribs. The length of this portion of the screw is 24 inches. The helical rib formation in all portions of the screw is of the same hand.

An extruder of this arrangement can be operated with the surrounded stationary barrel (not shown) at an outer surface temperature of 360° Fahrenheit throughout the length of the feed section F, a barrel temperature of 380°F. throughout the transition section T, and a barrel temperature of 400°F throughout the remainder of the barrel length, the screw rotating at 100 RPM, and feeding into the feed inlet a commercially available low density polyethylene pellet material of 2.0 Melt Index having a bulk density of 30 to 35 pounds per cubic foot, and pellets approximately ⅛ inch size, with pellets at a temperature between 70°F. and 100°F. A suitable throughput capacity for material treatment is 2400 pounds per hour which is more than 20% higher than the melting capacity obtainable with past practices of the art. The dynamic volumetric treatment capacity in this cited example is 3.35 times the total throughput rate.

Modifications in the geometry and performance of the device can be made without departing from the nature of the invention. The size, shape, arrangement pattern, relative position, spacing, and height of the protuberances are made according to the requirements of the treatment desired. The radial clearance of the spacing 21 can be greater at the upstream end 15 of the device where more and larger particles are present and smaller toward the downstream end 31 where fewer and smaller particles are present. This change in radial clearance can be gradual or in steps. The device can be used in two or more portions axially separated from each other; for example, by a conveying and pressure generating screw of the type illustrated in FIG. 1 at M. The protuberances can be arranged generally in the form of an interrupted helix as illustrated in FIG. 2 but having the hand of the helix opposite to that of the other portions of the screw.

What is claimed is:

1. An extrusion device comprising
a screw extrusion member for the movement of materials within a housing directly from a transitional section through a compounding section;
said transitional section having at least one channel which is reduced in depth in the direction of movement of said materials;
and said compounding section including means for simultaneously subjecting at least the major portion of the materials from said transitional section to high shear forces and high volume separational and combinational mixing; said compounding section comprising a plurality of discrete protuberances on the screw root of said member, each separated from an adjoining protuberance by an intervening passageway and having an outer surface forming a spacing with said housing greater than 0.001 and less than 0.02 times the maximum inside diameter of said housing.

2. An extrusion device comprising
a screw extrusion member for the movement of materials within a housing from a compounding section directly into a metering section;
said compounding section including at least one channel for the movement of said material and means for simultaneously subjecting at least the major portion of said materials to high shear forces and high volume mixing;
said metering section including at least one channel of lesser depth than any channel of said compounding section for the movement of said materials; said compounding section comprising a plurality of discrete protuberances on the screw root of said member, each separated from an adjoining protuberance by an intervening passageway and having an outer surface forming a spacing with said housing greater than 0.001 and less than 0.02 times the maximum inside diameter of said housing.

3. An extrusion device comprising
an extrusion member for the movement of materials within a housing;
said extrusion member including a plurality of discrete surfaces, each forming a spacing with said housing; and
said extrusion member includes a plurality of discrete passageways, each separated from an adjoining passageway by an intervening protuberance, with the depths of the passageways increasing progressively along the length of said member in the direction of movement of said materials;
thereby to subject said materials to high volume mixing.

4. An extrusion device in accordance with claim 3 wherein each spacing between said surfaces and said housing is wider at its leading edge than at its trailing edge in the direction of rotation of said member.

5. An extrusion device in accordance with claim 1 wherein each spacing between said surface and said housing is wider at its leading edge than at its trailing edge in the direction of rotation of said member.

6. An extrusion device in accordance with claim 2 wherein each spacing between said surface and said housing is wider at its leading edge than at its trailing edge in the direction of rotation of said member.

7. An extrusion device in accordance with claim 4 wherein said passageways increase to a full depth equal to the maximum height of the protuberances and further including a plurality of passageways having said full depth.

8. An extrusion device in accordance with claim 4 wherein each of said surfaces includes a step in the face thereof.

* * * * *